United States Patent [19]
Sheesley et al.

[11] 3,929,024
[45] Dec. 30, 1975

[54] ACTUATOR

[75] Inventors: John M. Sheesley; Ronald A. Gulick, both of Houston, Tex.

[73] Assignee: Research Engineering Co., Houston, Tex.

[22] Filed: Oct. 10, 1974

[21] Appl. No.: 513,576

[52] U.S. Cl. .................. 74/104; 74/89.15; 251/233; 251/58; 74/509; 92/13.7
[51] Int. Cl.² ............................................. F01B 9/00
[58] Field of Search .......... 74/89.15, 102, 526, 104, 74/509; 251/58, 233; 92/13.7, 13.8

[56] References Cited
UNITED STATES PATENTS

| | | | |
|---|---|---|---|
| 2,499,402 | 3/1950 | Manhartsberger | 251/233 |
| 2,857,783 | 10/1958 | Ranck, Jr. et al | 74/526 |
| 3,011,359 | 12/1961 | Morrell | 74/89.15 |
| 3,261,266 | 7/1966 | Ledeen et al. | 251/58 |
| 3,385,120 | 5/1968 | Nott | 74/509 |
| 3,459,058 | 8/1969 | Fawkes | 74/89.15 |
| 3,672,262 | 6/1972 | Karr | 74/104 |
| 3,704,986 | 12/1972 | Sheesley et al. | 74/104 |
| 3,797,324 | 3/1974 | Sheesley et al. | 74/89.15 |
| 3,877,677 | 4/1975 | Daghe et al | 74/89.15 |

*Primary Examiner*—John J. Camby
*Assistant Examiner*—Henry C. Yuen
*Attorney, Agent, or Firm*—Robert W. B. Dickerson

[57] ABSTRACT

A device for causing a valve to open or close, including an oscillatable yoke, the yoke having a depending arm with elongated slot therein, a reciprocable piston rod linked to said yoke, the linkage including an upstanding pin engaging said slot, the pin being positioned non-axially relative to the piston rod.

3 Claims, 4 Drawing Figures

ACTUATOR

BACKGROUND OF THE INVENTION

Actuators have long been used to cause the opening or closing of valves, and thereby to regulate the flow through conduits, such as oil or gas pipelines. A relatively recent development has involved the use of pressure activated, reciprocating pistons, to cause oscillation of a yoke member, which yoke has been keyed to an oscillatable or rotatable valve stem. Examples of such prior art are shown in U.S. Pat. Nos. 3,797,324; 3,385,120; and 3,727,523. The devices so illustrated have utilized a pin, movably inserted within a slot provided an arm of the yoke. The pin has normally been fixed to the piston rod, and axially aligned with such piston rod. Because of the geometry of the yoke arm slot, and the need to cause a substantially 90° oscillation of the yoke, it has been required that the piston rod pass closely adjacent the yoke. This has resulted in increased costs, due to required beefing up of the yoke, and limited the effective internal diameter of the yoke. The latter mentioned problem is particularly important due to the sometimes varying external diameter of valve stems, with which this actuator may be used. It was to overcome the problems discussed above, that this invention was developed.

BRIEF SUMMARY OF THE INVENTION

An oscillatable yoke is positioned within a housing, and includes key means for affixing a valve stem thereto. One or more aligned piston rods, caused to reciprocate by an outside power source, may so move within the housing. Said rod or rods are fixed to a plate member. Additionally, said plate carries a further upright pin, which pin extends within or through a slot provided an arm of the oscillatable yoke. This latter mentioned pin is positioned on said plate intermediate the axis of said piston rod or rods and the body of said yoke, i.e., offset relative to said piston axis. Thus, approximately a 90 degree arc may be traversed by the yoke while the line of piston rod reciprocation is substantially removed from the yoke body.

DESCRIPTION OF A PREFERRED EMBODIMENT

Figure 1:
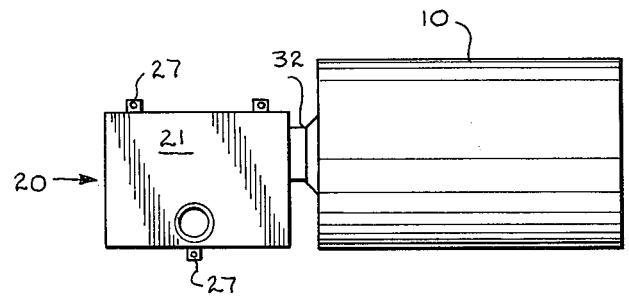
FIG. 1 is a generalized plan view of the actuator housing and power cylinder.
Figure 2:
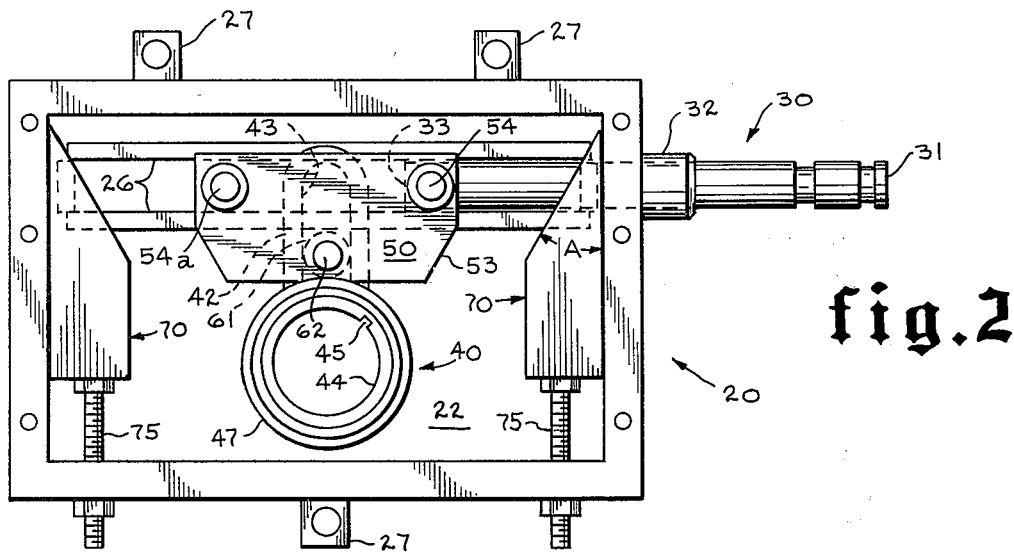
FIG. 2 is a plan view of the actuator, with the top cover removed.
Figure 3:
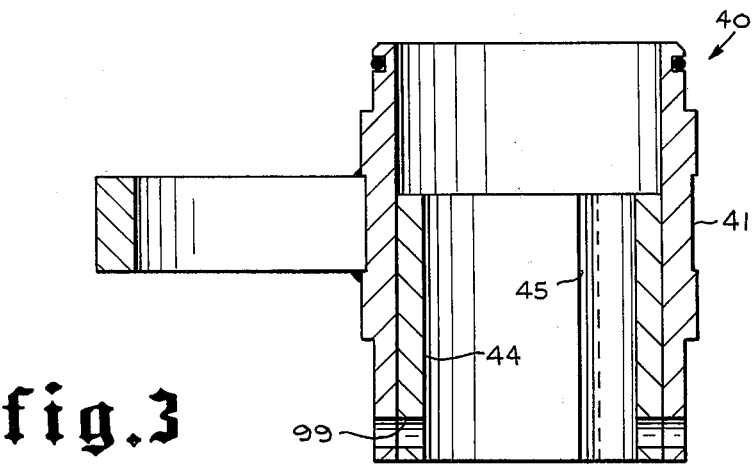
FIG. 3 is a vertical section through the yoke and valve stem adapter.
Figure 4:
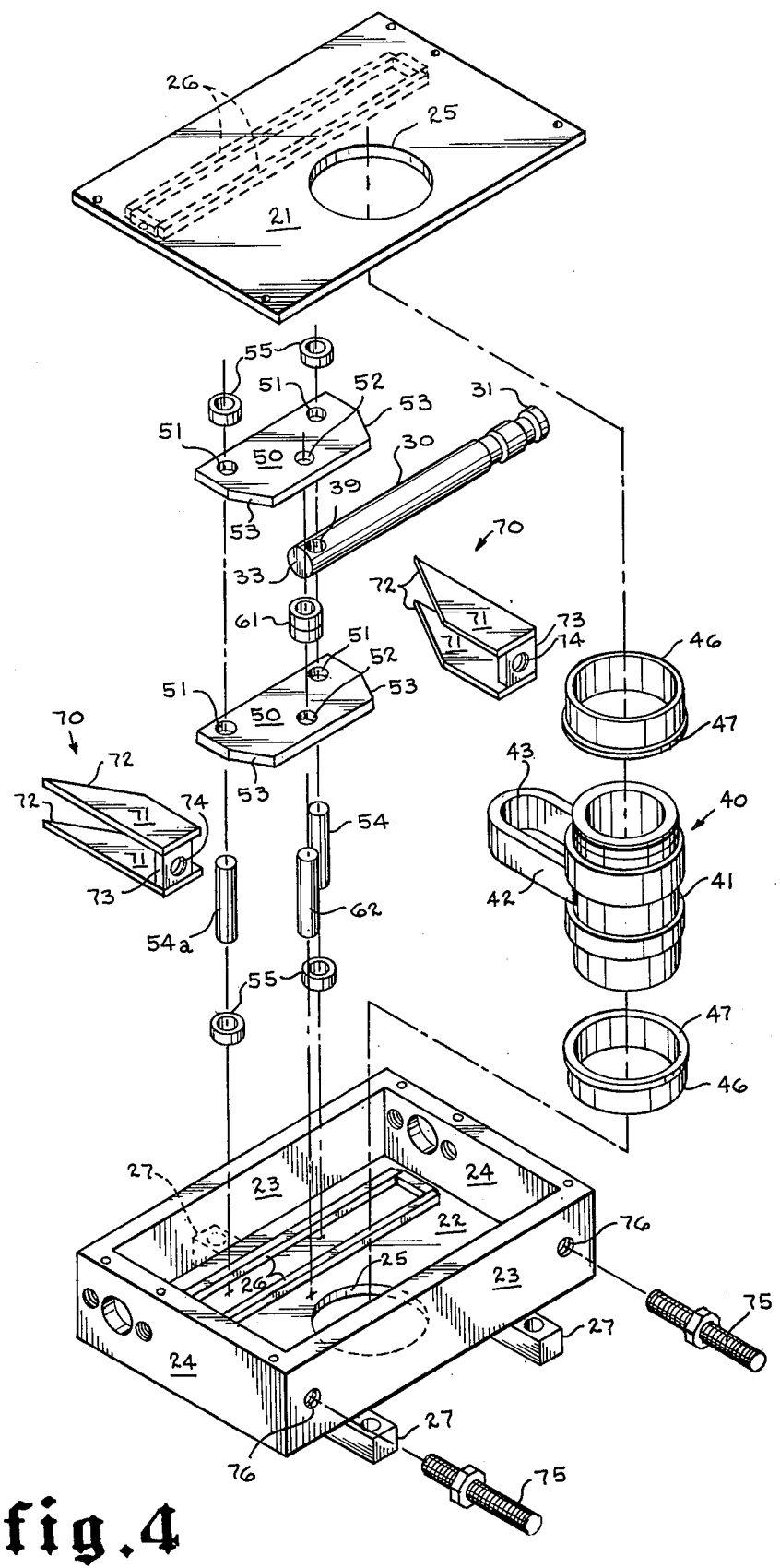
FIG. 4 is an exploded perspective of the actuator.

The actuator of this invention is the type generally controlled by a source of outside fluid pressure, which may be hydraulic or pneumatic. Although FIGS. 1 and 2 indicate only a single power cylinder and piston rod, it should be obvious that a plurality of such members may be used. Looking first at FIG. 1, the power cylinder is indicated generally at 10, is releasably fixed to the actuator housing 20. A source of fluid pressure may be provided to opposite ends of cylinder 10, in a conventional manner, from a source not shown, to act on a piston (also not shown) reciprocating therein. Such piston would be fixed at or near one end 31 of piston rod 30, which rod would reciprocate along with the piston. Rod 31 slidingly passes through bearing fitting 32, so that its other end 33 moves within the housing.

The housing 20 is modular, in that it includes upper and lower cover plates 21, 22 as well as vertical side walls 23 and end walls 24. Threaded apertures would be provided the various supporting walls and cover plates, for fasteners to secure the housing components. Both cover plates are seen to have aligned apertures 25 and track assemblies 26, whose purposes will be hereafter explained. The track assemblies, each comprising parallel rail members, are fixed to the side of the cover plate facing the internal portion of the housing. Lugs 27 may be provided the actuator housing for affixing the same to a valve housing.

Oscillatably disposed within housing 20, and with its axis perpendicular to plates 21, 22 is yoke 40, having a generally cylindrical hub 41. Affixed to said hub, depending centrally thereof, is arm 42, having a cut out or slot 43 lengthwise thereof. Interior of hub 41, a cylindrical adapter 44 may be fixed to the hub, for oscillation therewith, as by pin 99 passing through aligned apertures in members 41, 44, said adapter being keyed at 45 for fixing a valve stem (not shown) thereto. Cover plate apertures 25 may serve as bearing for hub 41, by having sleeves 46 fitted around the opposite ends of said hub. Each sleeve includes a depending flange 47, of greater diameter than said apertures. These flanges would each be positioned centrally of the housing from said apertures to prevent displacement through said apertures. The sleeve, and the portion of hub 41 encompassed thereby, outwardly in each instance from flange 47, may extend through apertures 25 in the cover plates.

A pair of like plates 50 are provided, each having aligned apertures 51 therethrough, a further aperture 52 out of such alignment, and beveled corners 53. Such plates are positioned on opposite sides of piston rod 30, adjacent end 33 thereof, and fixed to said rod 30 by virtue of pin 54 passing through aperture 39 through rod 30, near end 33, and on through apertures 51 in plates 50. A like pin 54a would pass through the oppositely disposed apertures 51 in said plates 50. In the event that plural power cylinders were used, or if one were a spring return cylinder, a piston rod counterpart to rod 30, having an aperture like that at 39, would be linked to said plates by pin 54a. The ends of both pins 54 and 54a extend beyond plates 50, and carry rollers 55. These rollers ride between, are guided by, and transmit forces to the side rails forming tracks 26 in both upper and lower cover plates 21 and 22.

An additional roller 61 is positioned intermediate plates 50, and in an aligned relationship with off-center apertures 52 through said plates. A further pin 62 passes through said apertures 52 and said roller 61. Said roller 61 and pin 62 pass through yoke slot 43, with said roller riding against the walls thereof.

Adjustable stop means are provided at opposite ends of the housing. They comprise a pair of blocks 70. Each block includes a pair of plates 71, each having beveled portions 72, said plates being separated by spacers 73 having a threaded aperture 74 therethrough. A threaded fastener 75, passing through aperture 76 in wall 23, adjustably positions blocks 70 by virtue of its threaded engagement with aperture 74. The angle of blocking, i.e., angle "A" approximates the friction angle, in order that little resultant force would be directed axially of fasteners 75.

In operation, an outside source of pressure would cause reciprocation of a piston within cylinder 10, and thereby of piston rod 30. Such reciprocation, by virtue of pin connection 54, would cause reciprocation of plates 50, and likewise of off-center pin 62, which carries roller 61. Said roller, being carried within slot 43 in yoke arm 42, causes oscillation of yoke 40, which, by virtue of being directly keyed to a valve stem, or by virtue of intermediate adapter 44, would cause valve stem oscillation, and thereby open or close the valve, depending on the direction of linear movement of piston rod 30. As mentioned, an oppositely disposed cylinder, piston and piston rod may be used, such as to the left of FIG. 2, if desired. Such may be a spring return cylinder. In any case, whereas pins 54, 54a, are linearly aligned with each other, as well as with piston rod 30, pin 62, the cause of yoke oscillation, is out of such alignment. This factor, as earlier described, permits greater effective internal yoke diameter accommodating a greater range of valve stems, and reduces yoke costs. Travel of plates 50, and thereby the yoke oscillation arc are regulatable by virtue of adjustably positioning blocks 70, whose beveled plate portions 72 intercept counterpart beveled portions 53 of plates 50.

Although only a single embodiment has been described, it should be obvious that numerous modifications would be possible by one skilled in the art without departing from the spirit of the invention, the scope of which is intended to be limited only by the following claims.

We claim:

1. A valve actuator for translating a linearly directed force into an oscillatable, force, comprising:
   a housing;
   an oscillatable yoke adapted to receive a portion of a valve, said yoke positioned within said housing and including a hub portion and a slotted arm depending from said hub;
   a movable member, movable along a first linear path, said member extending at least partially within said housing;
   means linking said movable member with said yoke whereby linear movement of said movable member is translated into oscillatable movement of said yoke, said linking means including,
   a. pressure exerting means, positioned at least partially within said slotted portion of said arm, and
   b. said pressure exerting means comprising a pin member being movable along a second linear path, said second linear path being nonintersecting with said first linear path, and being intermediate the outer diameter of said hub and said first linear path.

2. The actuator of claim 1 wherein said linking means further includes spaced parallel plates on opposite sides of said movable member and fixed thereto by pin means, said pin means passing through said movable member and said plates and carrying roller members at opposite ends thereof, and said housing includes opposed pairs of rail members, and said pin means roller members are so positioned as to ride between and be guided by said rail members.

3. The actuator of claim 2 and including adjustably positionable stop means having a beveled portion, and said plates also include beveled portions abuttably engageable with said stop means beveled portion.

* * * * *